United States Patent

[11] 3,591,269

| [72] | Inventors | John T. Watson<br>Wellesley Hills;<br>Kenneth Robinson, Needham, both of, Mass. |
|---|---|---|
| [21] | Appl. No. | 748,674 |
| [22] | Filed | July 30, 1968 |
| [45] | Patented | July 6, 1971 |
| [73] | Assignee | Itek Corporation<br>Lexington, Mass. |

[54] CONICAL SCAN PANORAMIC CAMERA
9 Claims, 6 Drawing Figs.

[52] U.S. Cl. .................................................. 352/69,
95/12.5, 95/15, 95/16
[51] Int. Cl. .................................................. G03b 37/00
[50] Field of Search .......................................... 352/69;
95/12.5, 16, 15, 17

[56] References Cited
UNITED STATES PATENTS

| 2,890,622 | 6/1959 | Wallin | 352/69 X |
| 3,214,232 | 10/1965 | Spear | 352/69 |
| 3,364,830 | 1/1968 | Aschenbrenner et al. | 95/12.5 |
| 3,463,070 | 8/1969 | Miller et al. | 95/15 |
| 3,468,230 | 9/1969 | Bellows | 95/12.5 |

*Primary Examiner*—John M. Horan
*Assistant Examiner*—Alan Mathews
*Attorneys*—Homer O. Blair, Robert L. Nathans, Lester S. Grodberg and Joseph S. Iandiorio ABSTRACT: A panoramic camera for obtaining an oblique scan of a photographed area, such an oblique scan being useful when a stereo view of the area is desired. The panoramic camera obliquely scans the photographed area with a conical pattern by rotating the optical scanner about a scan axis parallel to the photographed area. Front to back lateral distortion of the photographed image is compensated for by directing the image through a lens system having a constant image magnification gradient between the forward and rear edges of the film.

KENNETH ROBINSON
JOHN T. WATSON
INVENTORS

BY
Joseph L. Sandrovic
ATTORNEY

KENNETH ROBINSON
JOHN T. WATSON
INVENTORS

BY Joseph L. Sandurie

ATTORNEY.

CONICAL SCAN PANORAMIC CAMERA

CHARACTERIZATION OF INVENTION

The invention is characterized in scanning means rotatable about a scan axis parallel to the area to be photographed for performing an oblique scan of the area.

BACKGROUND OF THE INVENTION

This invention relates to panoramic cameras for performing oblique scans.

The problem of obtaining panoramic photographs having a proper stereo convergence angle providing suitable stereopsis has been met by using a pair of tilted panoramic cameras. However, the tilting of the camera necessarily results in tilting of the scan axis which causes lines on the ground parallel to the ground track of the camera to have their images projected onto the oblique film as nonparallel lines, diverging from the intersection of the scanning axis with the ground. As the camera moves forward over the ground these images are moved forward over the film and also sideways in the cross axis direction across the film because of the diverging posture of these images.

Attempts to correct this motion, which increases with increase in the tilt angle and varies from zero at the ground track to maxima in either direction from the ground track as a function of the scan angle, have often resulted in complex and expensive equipment which increases the size and weight of the camera and reduces or compensates for, but does not eliminate, the crosstrack motion.

Also in tilted panoramic camera photography the stereoscopic base lines of the photograph, i.e. those lines which are parallel to the ground track in object space, are not parallel to each other in the photograph. This complicates the use of the photographs in stereo viewing equipment.

Additionally, when two conventional panoramic cameras which scan about a horizontal axis are used they may be operated so that their angular momentums cancel. But when two such cameras are tilted to produce stereo photographs, complete cancellation of their angular momentums is not achieved.

Another problem occurring in panoramic cameras relates to the front mirror scanning type panoramic cameras. Front mirror scanning panoramic cameras are a type of panoramic camera in which scanning is performed by a rotating mirror and a stationary lens system located in the scanning path but beyond the angular limits of the scan angle so that the scanning mirror does not scan the lens system.

One disadvantage of such cameras is that for large scan angles the rotation of the mirror in the direction away from the lens system decreases the angle between the mirror surface and the optic axis of the lens system. This causes the projection of the lens aperture onto the mirror to become larger. Therefore it becomes necessary, when such cameras are required to perform large angle scans, to use large mirrors in order to prevent reduction of the aperture of the lens system. Increasing the size of the mirror increases the weight of the mirror, the power and space required for the mirror, and the problems of producing, mounting, and aligning the mirror.

SUMMARY OF THE INVENTION

Thus it is desirable to have available a panoramic camera capable of avoiding crosstrack image motion such as occurs in conventional panoramic cameras tilted to perform oblique scans.

It is also desirable to have available such a panoramic camera operable as a front scanning panoramic camera capable of performing large angle scans with a small scanning reflector.

It is also desirable to have available such a panoramic camera capable of scanning with a scanning mechanism rotatable about an axis parallel to the direction of camera motion for providing complete cancellation of angular momentums of a pair of cameras performing tilted-scan panoramic photography.

It is also desirable to have available such a panoramic camera having apparatus for providing photographs having parallel base lines for ease of viewing in stereo equipment.

It is also desirable to have available a panoramic camera for performing oblique scans in a conical mode.

The invention may be accomplished by a panoramic camera for performing a scan in a conical mode including scanning means rotatable about a scan axis parallel to the area to be photographed for performing an oblique scan of that area, and including compensating means which provide uniform scan image velocity over the length of the slit.

DISCLOSURE OF PREFERRED EMBODIMENTS

Other objects, features, and advantages will occur from the following description of preferred embodiments and the accompanying drawings, in which.

Figure 1:
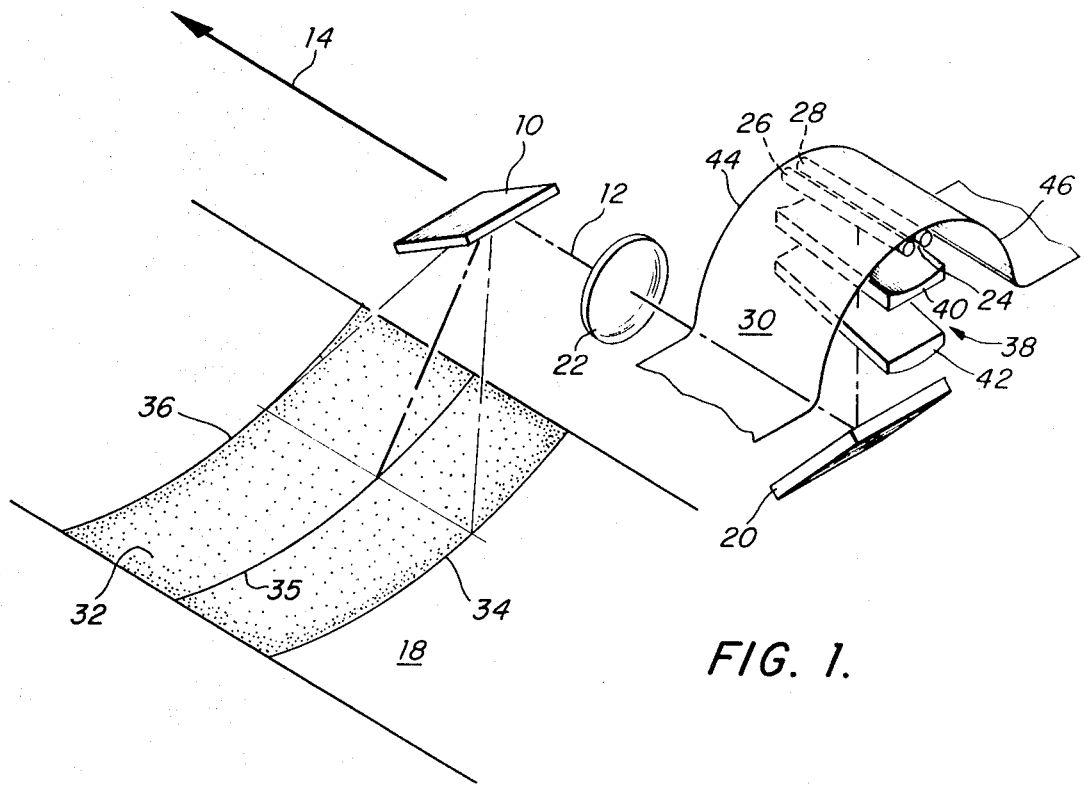
FIG. 1 is a perspective diagram of an optical bar type panoramic camera which provides an oblique conical scan according to this invention.

In one embodiment of the invention crosstrack image motion arising from forward or rearward obliquity is avoided by rotating a scanning reflector 10, FIG. 1, inclined to scan at an oblique angle, about a horizontal axis 12 which is parallel to the direction of motion, arrow 14, of the camera over the ground 18. The image of the ground scene scanned by reflector 10 is directed to imaging reflector 20 through lens 22 along the axis 12. From reflector 20 the image is directed through the exposure slit 24 formed between rollers 26 and 28 and onto cylindrically disposed film 30. The path of the radiation between reflectors 10 and 20 is not necessarily parallel to the horizontal axis of rotation of the scanning mechanism.

The conical scan mode created by the rotation of reflector 10 about a horizontal axis 12 while inclined to view the scene on the ground at an oblique angle defines a format 32 having curved rearward 34 and forward 36 edges. As a result there is an image motion which can be described as a superposition of a pure translational velocity and a pure rotational velocity about the optical axis. The rotational rate causes a variation of the velocity of the scan image motion over the slit length between the rearward 34 and forward 36 edges. That is, for a given angular scan more distance is covered in the scan direction at the rearward edge 34 than at the forward edge 36. As a result there is a distortion of the image which, in the scan direction, expands the rearward portion of the image and condenses the forward portion relative to the lateral centerline 35 of the format 32.

Figure 2:
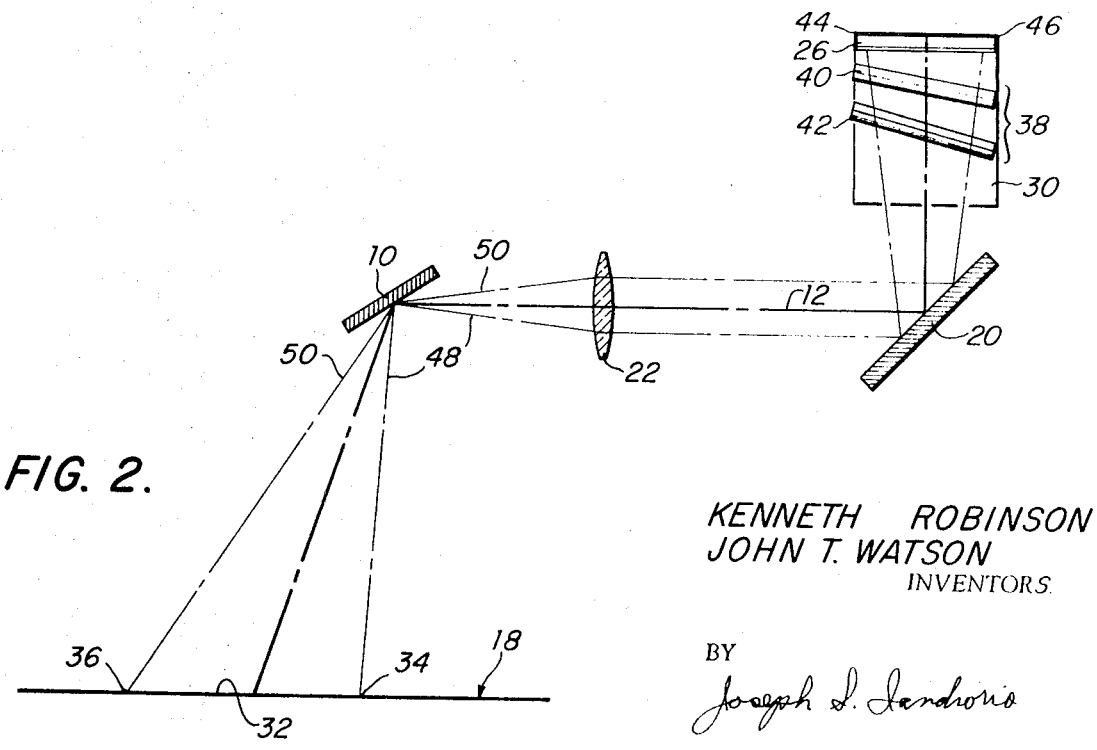
FIG. 2 is a side view diagram of a panoramic camera similar to FIG. 1 showing the inversion of the image at the film and showing means for compensating for the scan image motion gradient caused by the scanning in the conical mode.

To compensate for the resulting nonuniform velocity of the scan image motion, variable magnification of the image along the slit 24 length is provided by a lens system 38, preferably a combination of a negative cylindrical lens 40 and a positive cylindrical lens 42, FIG. 2. Lenses 40 and 42 are tilted relative to each other and to the film 30 to provide increasing magnification from the forward edge 44 of film 30 to the rearward edge 46. The scan image motion gradient from edge 34 to edge 36 of format 32 is constant during the entire scan so that lenses 40 and 42 need not be moved relative to each other nor radially towards or away from film 30. They may be fixed in position with respect to the slit 24. Since the image of format 32 is reversed on film 30, the scan image motion gradient which increases magnification from front 44 to rear 46 edge of film 30 is provided and the magnification is calculated to compensate for the apparent expansion in the scan direction of format 32 from its forward 36 to its rearward 34 edge. The inversion of the image may be seen in FIG. 2 by tracing the path of rearward ray 48 and forward ray 50 from format 32 to film 30. The compensation for the scan image motion gradient may be accomplished by various optical means other than the tipped cylindrical lens means. For example, conical lenses or tipped spherical lenses may be used to effect the compensation. To compensate for the scan image motion gradient there is provided along the length of the slit 24 a gradient of the transverse magnification in the front to rear direction on the film and the magnification in the scan direction may be unity or more or less than unity or any desired level including levels of magnification included on the front to rear magnification gradient.

Figure 3:
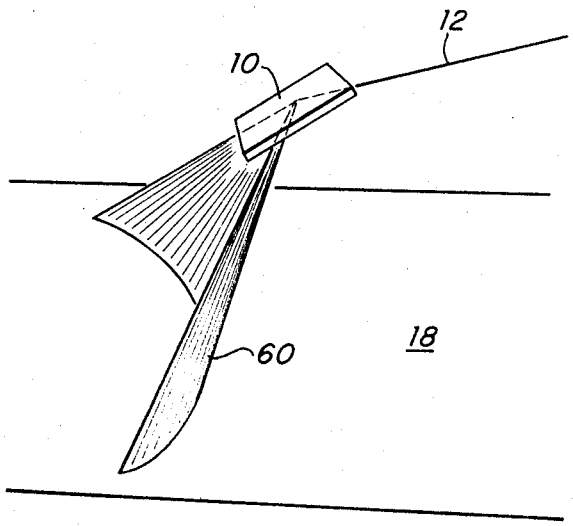
FIG. 3 is a perspective view of the conical pattern developed by the conical mode of operation of the scanning mirror of FIG. 1.

The conical scan mode achieved by reflector 10 may be seen in FIG. 3. Conical surface 60 is that which is described by the light received from ground 18 by reflector 10.

In accordance with this invention a conical scan may be used in all types of panoramic cameras such as direct scanning types, and in other types of cameras used for tilted photography. The invention is not limited to use with two reflectors, as other means of deflecting the radiation such as refracting prisms may be used. A single prism capable of performing an oblique scan about a horizontal axis and projecting the image to the film may also be used. Also the invention is not limited to use with visible light systems but applies to systems using other types of radiation as well, for example infrared, ultraviolet, x-ray.

A conical scan front mirror scanning panoramic camera embodiment of the invention may be constructed so that its optical system may receive radiation from the front scanning mirror, not in the scanning plane or path, but external to that path in a plane transverse to the scanning plane, preferably in the vertical plane containing the ground track. In such an arrangement the scanning mirror may begin scanning at the optic axis of the optical system where its projection to the optical system is at a maximum unlike conventional front scanning panoramic cameras wherein the mirror must begin its scan sufficiently rotated from the optic axis to avoid scanning the optical system. In addition to this advantage, such an arrangement also enables the scanning mirror to scan on either side of the optic axis of they optical system.

Thus a mirror which is large enough to cover the aperture of the lens system when that mirror is at a maximum angle to the optic axis of the optical system may be used to perform a total scan of twice that angle by scanning the same amount on either side of the optic axis. In conventional front scanning panoramic cameras an increase in total scan angle necessitates an increase in the size of the mirror.

Figure 4:
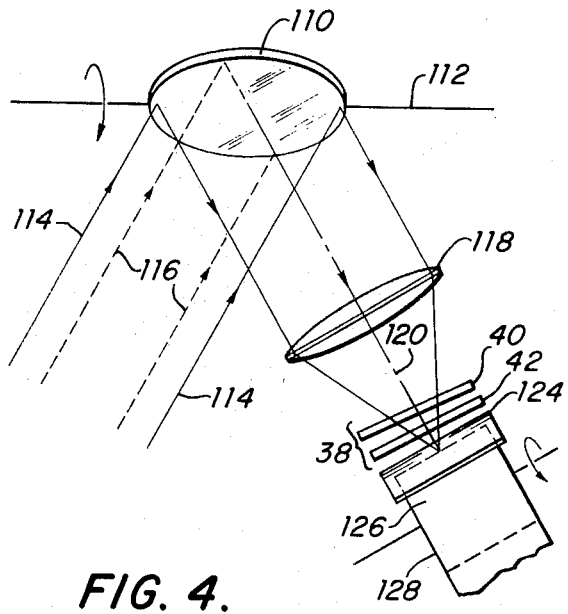
FIG. 4 is a diagrammatic side view of a portion of a front mirror conical scanning panoramic camera according to this invention.
Figure 5:
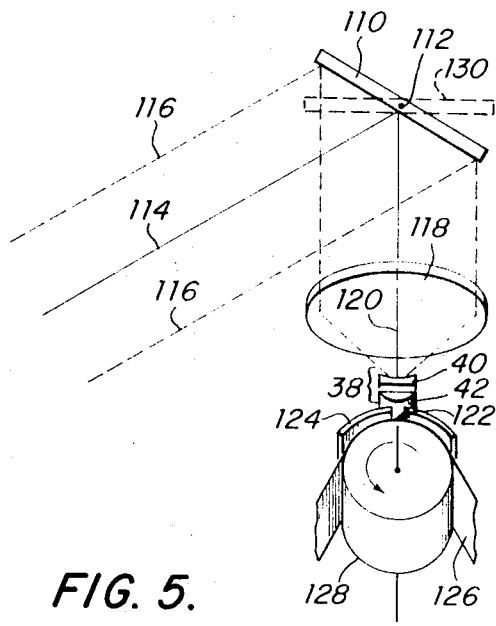
FIG. 5 is a rear view of the portion of the camera of FIG. 4.

In FIG. 4, a circular mirror 110, rotatable about scanning axis 112, receives radiation 114, 116 from the photographed area and reflects it to a lens 118 having its optic axis 120 in a plane transverse to the direction of the scan performed by mirror 110. Lens 118 projects the radiation through slit 122, FIG. 5, in plate 124 to film 126 on rotating drum 128. From the embodiment shown in FIG. 4 and the alternate view of it in FIG. 5 it may be seen that by locating the lens 118 and film 126 so that the radiation may be directed from mirror 110 in a direction transverse to the direction of rotation of mirror 110 the influence of the scan angle on the size of the mirror has been halved. For now a mirror sized to reflect, at a particular angle, the proper area to lens 118 may be utilized to perform satisfactorily a scan of twice that angle by rotating the mirror the amount of that particular angle in each direction from the center position 130, FIG. 5, in which lens 118 views the full width of mirror 110 perpendicular to the scanning axis 112.

In this embodiment as in the embodiment discussed in relation to FIGS. 1—3, lens system 38 including cylindrical lenses 40 and 42 may be used to compensate for the scanning motion gradient caused by the scan in the conical mode.

Figure 6:
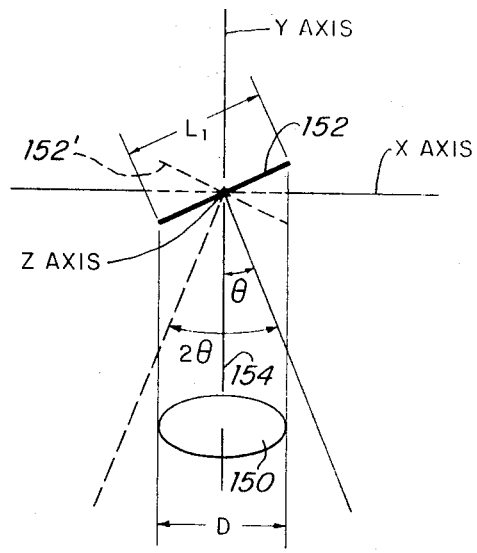
FIG. 6 is a diagram demonstrating the relationship between scan angle and mirror size in a front mirror conical scanning camera according to this invention.

This embodiment of the invention can provide a large scan using a small mirror approximately the size of the lens aperture D, FIG. 6, by removing the lens 150 and optical system from the scanning plane and placing them external to the scanning path. In FIG. 6 the optic axis of lens 150 is in the Z-Y plane below the Z-axis, about which mirror 152 rotates, and is looking upward along its optic axis 154 at mirror 152. Mirror 152 having a length L, projects an area D to lens 150 while scanning $\theta°$ to each side of optic axis 154 for a total scan angle of $2\theta$.

Thus a mirror of any particular length which is capable of performing a scan angle of $\omega°$ in a conventional from mirror scanning camera, may be used with the present invention to perform a scan angle of at least $2\omega°$.

Other embodiments will occur to those skilled in the art and are within the following claims:

What we claim is:

1. A panoramic camera comprising:
    a. means forming an image plane within the camera;
    b. scanning means for obliquely scanning an area to be photographed with a conical scanning pattern, and including an optical scanner rotatable about a scan axis substantially parallel to the area being photographed; and
    c. means for transferring an image from said optical scanner to said image plane, and including compensating means for providing a constant image magnification gradient at the image plane between forward and rear edges of the image plane to correct for a scan image motion gradient caused by said oblique, conical scanning pattern.

2. The camera of claim 1 in which said compensating means includes optical means for producing a magnification gradient in the image to compensate for said scan image motion gradient.

3. The camera of claim 1 in which said compensating means includes aspheric lens means for producing a magnification gradient in the image to compensate for said scan image motion gradient.

4. The camera of claim 1 in which said compensating means includes a fixed anamorphic lens system for producing a magnification gradient in the image to compensate for said scan image motion gradient.

5. The camera of claim 4 in which said anamorphic lens system includes tipped cylindrical lenses.

6. The camera of claim 5 in which one of said cylindrical lenses is a negative lens and another is a positive lens.

7. Apparatus as set forth in claim 1 wherein said optical scanner includes a reflecting means, having a plane reflecting surface, positioned to have said scan axis intersect said plane reflecting surface at an oblique angle.

8. Apparatus as set forth in claim 1 wherein said optical scanner includes a reflecting means, having a plane reflecting surface, positioned to have said scan axis located in said plane reflecting surface.

9. Apparatus as set forth in claim 8 wherein said transferring means includes a lens system positioned off said scan axis and displaced from said reflecting means along an axis parallel to said scan axis.